(12) United States Patent
Egan et al.

(10) Patent No.: US 9,856,007 B2
(45) Date of Patent: Jan. 2, 2018

(54) HYBRID VTOL VEHICLE

(71) Applicant: Egan Airships, Inc., Seattle, WA (US)

(72) Inventors: James C. Egan, Seattle, WA (US); Joel D. Egan, Seattle, WA (US)

(73) Assignee: EGAN AIRSHIPS, INC., Seattle, WA (US)

( * ) Notice: Subject to any disclaimer, the term of this patent is extended or adjusted under 35 U.S.C. 154(b) by 7 days.

(21) Appl. No.: 14/898,708

(22) PCT Filed: Jun. 26, 2014

(86) PCT No.: PCT/US2014/044457
§ 371 (c)(1),
(2) Date: Dec. 15, 2015

(87) PCT Pub. No.: WO2014/210393
PCT Pub. Date: Dec. 31, 2014

(65) Prior Publication Data
US 2016/0137281 A1    May 19, 2016

Related U.S. Application Data

(60) Provisional application No. 61/840,145, filed on Jun. 27, 2013.

(51) Int. Cl.
*B64B 1/20* (2006.01)
*B64B 1/14* (2006.01)
(Continued)

(52) U.S. Cl.
CPC ............ *B64B 1/20* (2013.01); *B64B 1/14* (2013.01); *B64B 1/22* (2013.01); *B64B 1/28* (2013.01);
(Continued)

(58) Field of Classification Search
CPC ......... B64B 2201/00; B64B 1/20; B64B 1/30; B64B 1/34; B64B 1/08; B64B 1/28; B64B 1/62; B64B 1/00; B64B 1/06; B64B 1/12; B64B 1/24; B64C 2201/022; B64C 2201/101; B64C 27/52; B64C 29/0033
See application file for complete search history.

(56) References Cited

U.S. PATENT DOCUMENTS 1,726,062 A * 8/1929 Gilman .................... B64B 1/12
    244/25
4,591,112 A * 5/1986 Piasecki ................... B64B 1/00
    244/17.13
(Continued)

FOREIGN PATENT DOCUMENTS

WO    97/15492 A2    5/1997

*Primary Examiner* — Richard G Davis
(74) *Attorney, Agent, or Firm* — Seed IP Law Group LLP

(57) ABSTRACT

A hybrid VTOL vehicle having an envelope configured to provide hydrostatic buoyancy, a fuselage attached to the envelope and having at least one pair of wings extending from opposing sides thereof to produce dynamic lift through movement, and a thrust generation device on each wing and configured to rotate with each wing about an axis that is lateral to a longitudinal axis of the envelope to provide vertical takeoff or landing capabilities. Ideally, the envelope provides negative hydrostatic lift to enhance low-speed and on-the-ground stability.

13 Claims, 17 Drawing Sheets

(51) Int. Cl.
  *B64B 1/22* (2006.01)
  *B64B 1/28* (2006.01)
  *B64B 1/30* (2006.01)
  *B64B 1/38* (2006.01)
  *B64B 1/58* (2006.01)
  *B64B 1/70* (2006.01)
  *B64C 39/02* (2006.01)
  *B64B 1/34* (2006.01)
  *B64B 1/60* (2006.01)

(52) U.S. Cl.
  CPC ............... *B64B 1/30* (2013.01); *B64B 1/34* (2013.01); *B64B 1/38* (2013.01); *B64B 1/58* (2013.01); *B64B 1/60* (2013.01); *B64B 1/70* (2013.01); *B64C 39/024* (2013.01); *B64B 2201/00* (2013.01); *B64C 2201/022* (2013.01); *B64C 2201/101* (2013.01); *B64C 2201/104* (2013.01)

(56) References Cited

U.S. PATENT DOCUMENTS

| | | | |
|---|---|---|---|
| 5,823,468 A * | 10/1998 | Bothe | B64B 1/08 244/12.3 |
| 6,196,498 B1 | 3/2001 | Eichstedt et al. | |
| 6,311,925 B1 | 11/2001 | Rist | |
| 7,131,613 B2 * | 11/2006 | Kelly | B64B 1/20 244/127 |
| 2005/0116091 A1 | 6/2005 | Kelly | |
| 2007/0187547 A1 * | 8/2007 | Kelly | B64B 1/20 244/7 R |
| 2012/0273608 A1 * | 11/2012 | Jess | B64B 1/08 244/26 |
| 2013/0277496 A1 * | 10/2013 | Kraus | B64B 1/00 244/25 |

* cited by examiner

HYBRID VTOL VEHICLE

CROSS REFERENCE TO RELATED APPLICATION

This application claims the benefit under 35 U.S.C. §119 (e) to U.S. Provisional Application No. 61/840,145 filed on Jun. 27, 2013, which application is incorporated by reference herein in its entirety.

BACKGROUND

Technical Field

The present disclosure pertains to vehicles capable of flight and, more particularly, to manned and unmanned vehicles having combined methods of lift, including dynamic lift and displacement buoyancy.

Description of the Related Art

Aircraft are vehicles that are capable of flight and include lighter-than-air aircraft, which can rise and remain suspended by using contained gas weighing less than the air that is displaced by the gas, as well as heavier-than-air aircraft, such as fixed and movable wing airplanes, which use dynamic lift created by movement of a wing through the air and rotary wing craft such as helicopters. Each type of aircraft has its own advantages and disadvantages.

In an effort to utilize the advantages of different modes of lift, proposals have been made for combining wings with lighter-than-air aircraft. For example, U.S. Pat. No. 6,311,925 describes an airship and method for transporting cargo having a supporting structure in the airship envelope that has attached thereto the airfoils or wings, which extend outward from the airship. This design attempts to avoid the structural limitations of having loaded wings exerting force directly on the airship envelope. Although jet-assisted turboprop engines are used on the wings, this design makes inefficient use of both forms of lift taken together and in combination with the turboprop engine. Moreover, this design does not utilize the vertical takeoff or landing (VTOL) capabilities of fixed wing aircraft, in part because the envelope is designed to provide sufficient lift to overcome the weight of the aircraft; i.e., it has a positive hydrostatic buoyancy.

One disadvantage of having positive hydrostatic buoyancy is the difficulty of controlling the lighter-than-air aircraft on or near the ground in windy conditions. Another disadvantage is that such vehicles must have large drag-inducing profiles in order to hold sufficient gas to provide the necessary static lift. Moreover, the forward speed of this design is limited to generally 50 knots or less.

Hence, there is a need for an aircraft that can combine hydrostatic buoyancy with aerodynamic lift in which increase airspeed is achievable without unduly stressing the envelope and that provides increased dynamic control in windy conditions and maneuverability near the ground. In addition, such a craft should provide safe engine-out performance to ensure cargo and passengers are unharmed in the event of an engine-out descent.

BRIEF SUMMARY

The present disclosure is directed to a hybrid aircraft that utilizes both hydrostatic buoyancy (in this case aerostatic buoyancy) generated by a gas in combination with lift generated by airfoil wings moving through the air in response to thrust generation devices on each wing, for example, propellers, fans, jets, and the like.

In accordance with one aspect of the present disclosure, a vehicle is provided that includes a first lift device capable of providing aerostatic buoyancy; a second lift device capable of providing dynamic lift through movement; and a system structured to generate thrust coupled to the second lift device, the second lift device and the thrust generation system capable of rotating together about an axis that is lateral to a longitudinal axis of the vehicle at angles at least in the range of 90 degrees to and including 180 degrees.

In accordance with another aspect of the present disclosure, a vehicle is provided as described above in which the second lift device includes first and second wings on first and second sides of the vehicle, the first and second wings each having a respective thrust generation device coupled thereto. Ideally, each wing is capable of individually rotating about a rotational axis independently of the other wing.

In accordance with yet another aspect of the present disclosure, a vehicle is provided as described above in which the first lift device includes an envelope structured to hold a gas that is capable of providing displacement buoyancy to the vehicle; and further comprising a compartment capable of attachment to the envelope, the compartment having the second lift device attached thereto.

In accordance with yet another aspect of the present disclosure, a vehicle is provided as described above in which the compartment is structured as a fuselage and the second lift device includes first and second wings extending from the fuselage in a direction that is lateral to a longitudinal axis of the envelope.

In accordance with yet another aspect of the present disclosure, a vehicle is provided as described above in which the first and second wings are each configured to rotate either together or independently or both together and independently about an axis that is lateral to the longitudinal axis of the envelope. Alternatively, the wings can have a forward sweep so that when the wings rotate the engines to face upward, the engines are positioned higher above the ground.

In accordance with yet another aspect of the present disclosure, a vehicle is provided as described above in which each thrust generation device includes a propeller mounted to a respective wing and configured to move jointly with the wing when the wing rotates about the lateral axis.

In accordance with yet another aspect of the present disclosure, a vehicle is provided as described above in which each wing is configured to rotate about a longitudinal axis of the wing, which is lateral to a longitudinal axis of the vehicle. Ideally the wings together or independently rotate in a range of at least 90 degrees to and including 180 degrees about a longitudinal axis of the wing, which is lateral to a longitudinal axis of the envelope. In some configurations the wing can rotate beyond 180 degrees, to and including 270 degrees, and beyond 270 degrees.

In accordance with a further aspect of the present disclosure, a vehicle is provided that includes a third wing mounted to extend from the fuselage in the same direction as the first wing and a fourth wing mounted on the fuselage to extend in a direction that is the same as the direction of the second wing.

In accordance with still yet another aspect of the present disclosure, a vehicle is provided in which the third and fourth wings are coplanar with the first and second wings, and the third and fourth wings each include a respective thrust generation device coupled thereto.

In accordance with another aspect of the present disclosure, a vehicle is provided in which the fuselage is capable of holding passengers. Alternatively, the fuselage is configured to hold cargo and the vehicle is capable of being remotely controlled by a human controller or a remote automated control system, such as a system on the ground or in another vehicle in the air, in space, on land or on water.

BRIEF DESCRIPTION OF THE SEVERAL VIEWS OF THE DRAWINGS

The foregoing and other features and advantages of the present disclosure will be more readily appreciated as the same become better understood from the following description when taken in conjunction with the accompanying drawings, wherein.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or components or both associated with aircraft and aircraft propulsion and control systems, and air traffic control, including but not limited to engines, propellers, control surfaces such as ailerons, rudders, elevators, nacelles, and autopilots, remotely piloted vehicles, and the like have not been shown or described in order to avoid unnecessarily obscuring descriptions of the embodiments.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Figure 1:
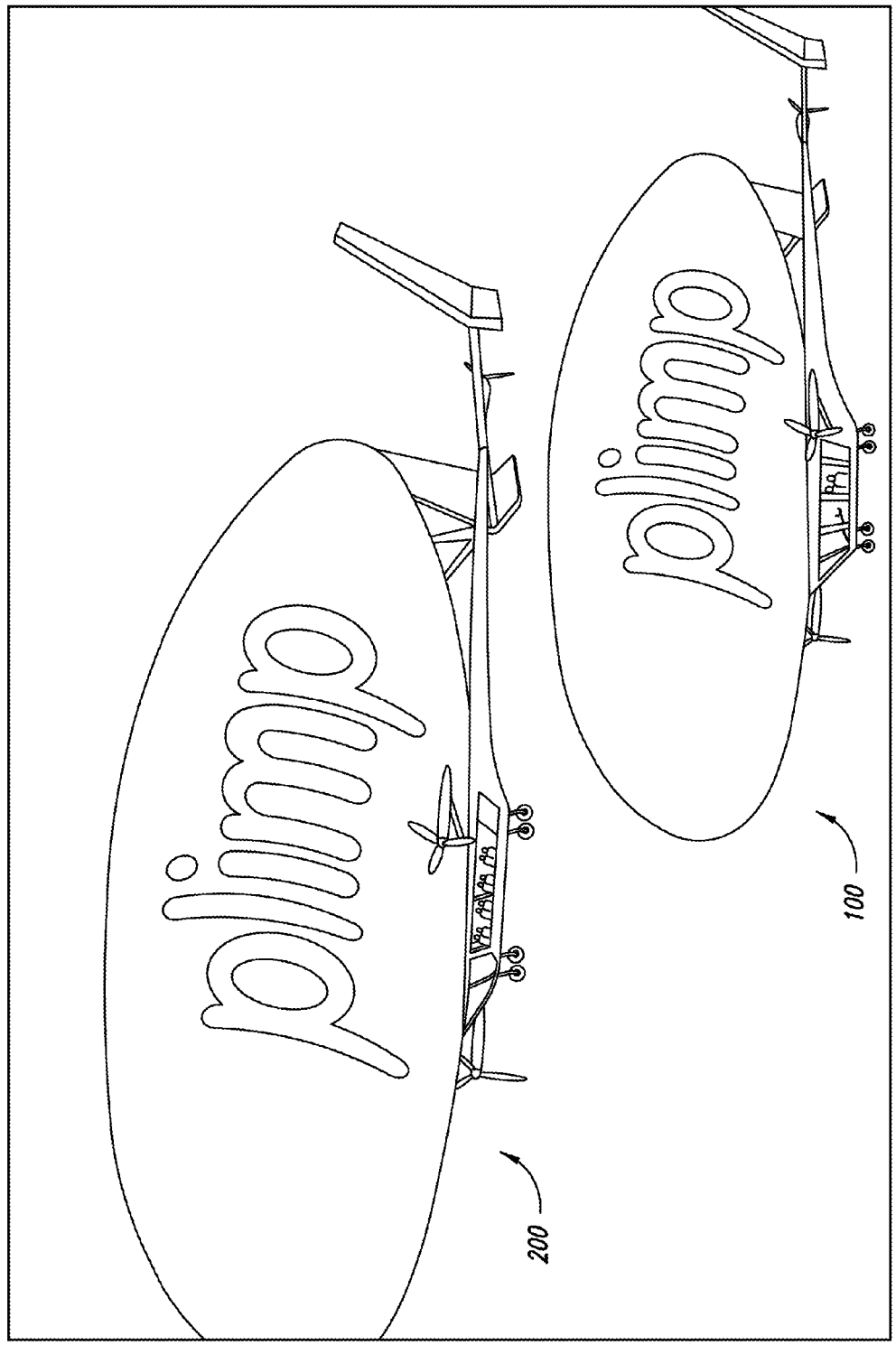
FIG. 1 is an isometric view of first and second alternative embodiments of a hybrid VTOL vehicle formed in accordance with the present disclosure.

Referring initially to FIG. 1, shown there are two related embodiments of the present disclosure in the form of a first hybrid vehicle A denoted with reference number 100 and a second hybrid vehicle B, which is a larger version of the former, denoted with reference number 200. Because these hybrid vehicles embody characteristics of both an airplane and a blimp, these vehicles will be referred to throughout this description as a "Plimp." It is to be understood that although two versions of the Plimp are illustrated and described herein, additional versions for a variety of applications can be developed using the disclosed features or additional features known to those skilled in the art. Where applicable, parts and components common to both embodiments will be described with the same reference number.

As seen generally in FIG. 1, the Plimp 100 has a first lift device in the form of an envelope 102 and a second lift device in the form of first and second (left and right) wings 104, 106 that extend laterally from a fuselage 108 attached to the envelope 102. Projecting aft of the fuselage 108 is a single tail boom 110 having at an aftward end 112 a horizontal stabilizer 114. The horizontal stabilizer 114 has free ends 116 with a vertical stabilizers 118, 120 projecting upward from the respective free end 116.

Propulsion is provided by a pair of propellers 122 mounted to respective electric motors 124 in nacelles 126 on each of the wings 104, 106. Directional control is provided in part by an orbital tail rotor 128 mounted on the aftward end 112 of the tail boom 110. Ideally, each wing 104, 106 can rotate about its longitudinal axis so as to rotate the propellers from a horizontal thrust position to a vertical thrust position, as described in more detail below, which can provide additional directional control. To support the Plimp 100 on the ground, wheels 130 are utilized, which extend from the fuselage 108.

The Plimp design is configured to provide a split between aerodynamic and aerostatic lift. Balancing these two types of lifts is important because too much aerostatic lift will make the vehicle unmanageable at low or zero airspeeds, such as when the vehicle is on the ground in high winds. In contrast, too little aerostatic lift forces the use of oversized engines for vertical takeoff or landing (VTOL) operations. Another factor in the design of the Plimp is the fact that the envelopes of most blimps are not strong enough to take wing loads without heavy internal reinforcements or a carry-through box. With non-circular envelope cross-sectional configurations, it is not possible to connect wings to the envelope without providing internal structure or providing a segmented envelope, all of which increase weight. Other considerations include utilizing aircraft-like landing gear in order to provide a rolling takeoff and the ability of the propellers to rotate to a horizontal attitude while on the ground. In addition, the vertical stabilizers must be large enough for providing stability and, if desired, control, which can be in the form of a rudder. Attaching these control surfaces to the hull usually results in external bracing and complicated hull construction and inflation.

In the design of the Plimp, consideration was also given to governmental requirements for airship design, both from the U.S. Federal Aviation Agency (FAA) and, for example, the German LFLS, which require:

1. The envelope be protected against deterioration or lost of strength in service due to weathering, corrosion, and abrasion.

2. The envelope must be designed to be pressurized while supporting the limit design loads for all flight and ground conditions, and local aerodynamic pressures, which must be included in the determination of stresses.
3. The envelope fabric must have an ultimate strength not less than four times the limit load determined by the maximum design internal pressure combined with the maximum load.
4. Internal or external or both internal and external suspension systems for supporting components such as the fuselage, must be designed to transmit and distribute the resulting loads to the envelope in a uniform manner for all flight conditions.

Figure 2:
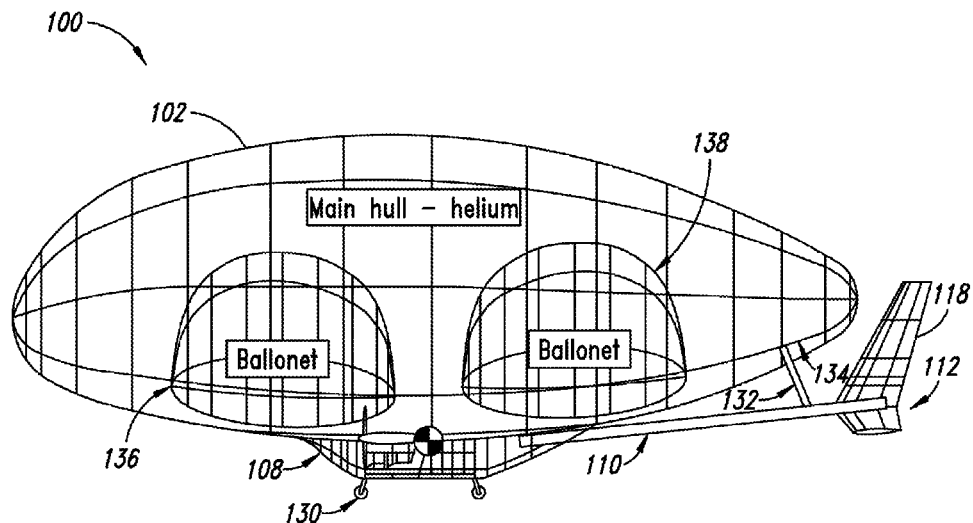
FIGS. 2-4 are see-through side, top, and front views respectively of the vehicle of the first embodiment shown in FIGS. 2-7 with the nacelles in a forward facing orientation.
Figure 3:
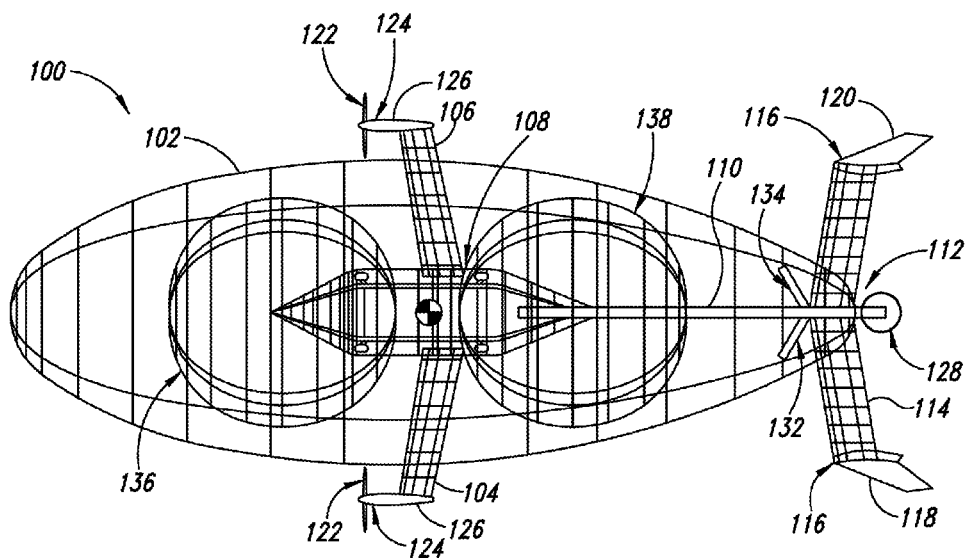
Figure 4:
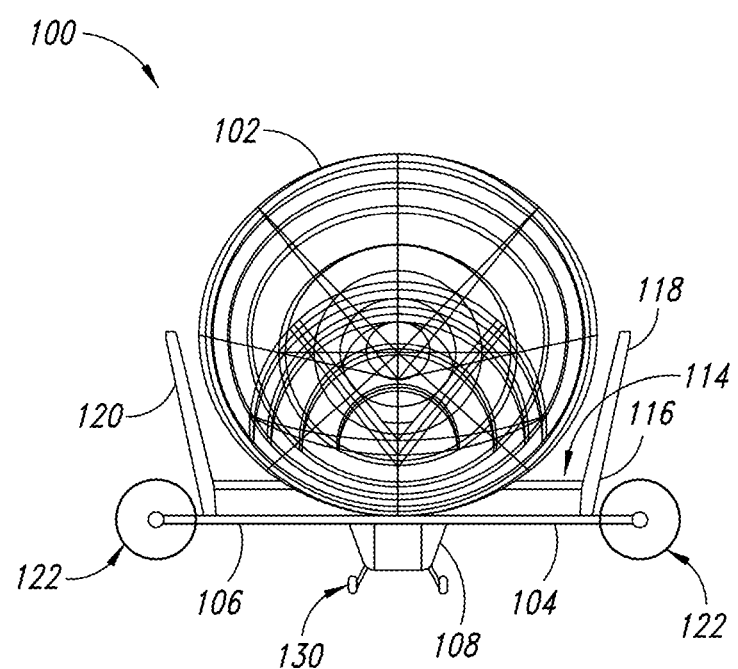
Figure 5:
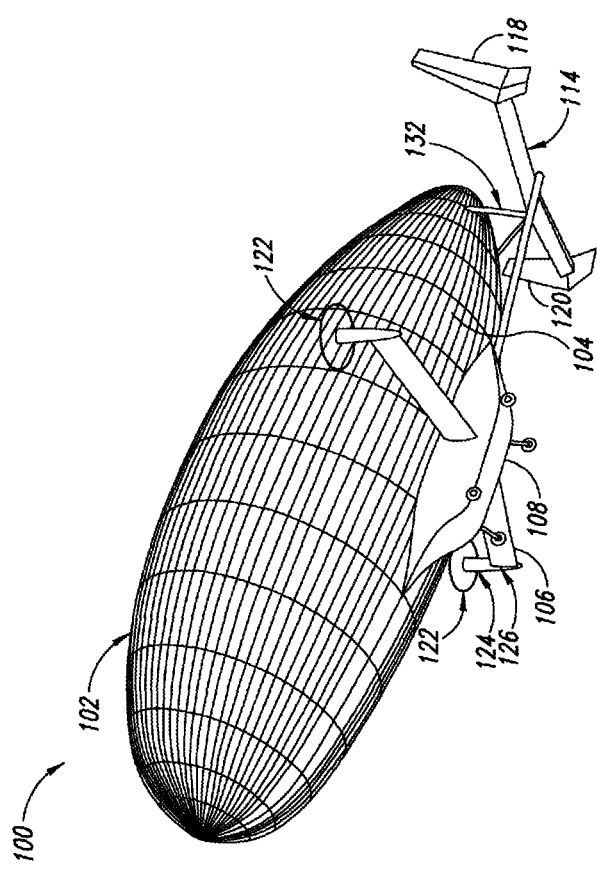
FIGS. 5-8 are see-through isometric, side, top, and front views, respectively of the first embodiment with the nacelles in a 90° rotated back or vertical orientation.
Figure 6:
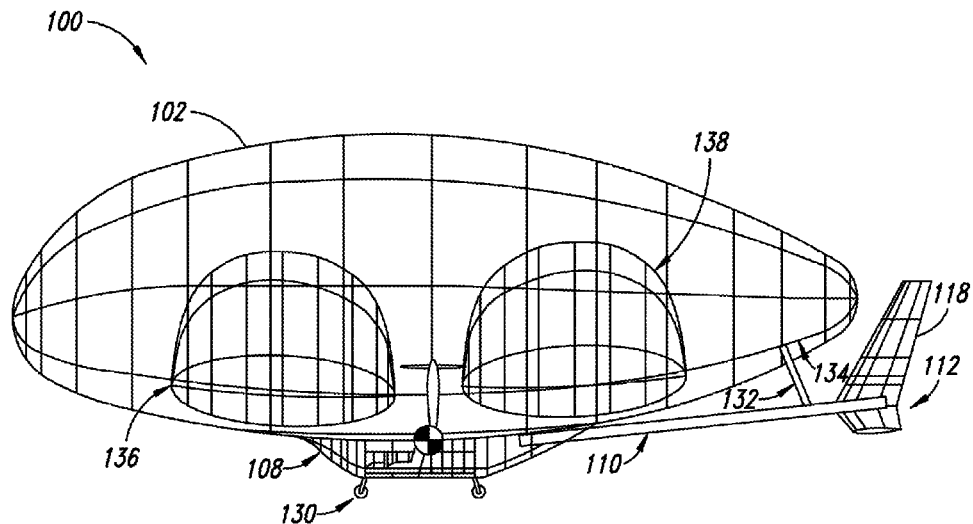
Figure 7:
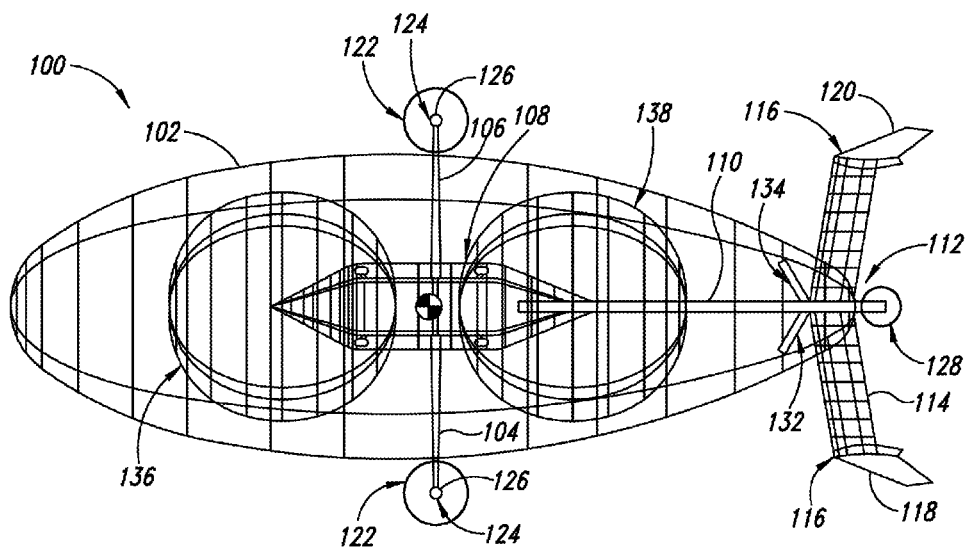
Figure 8:
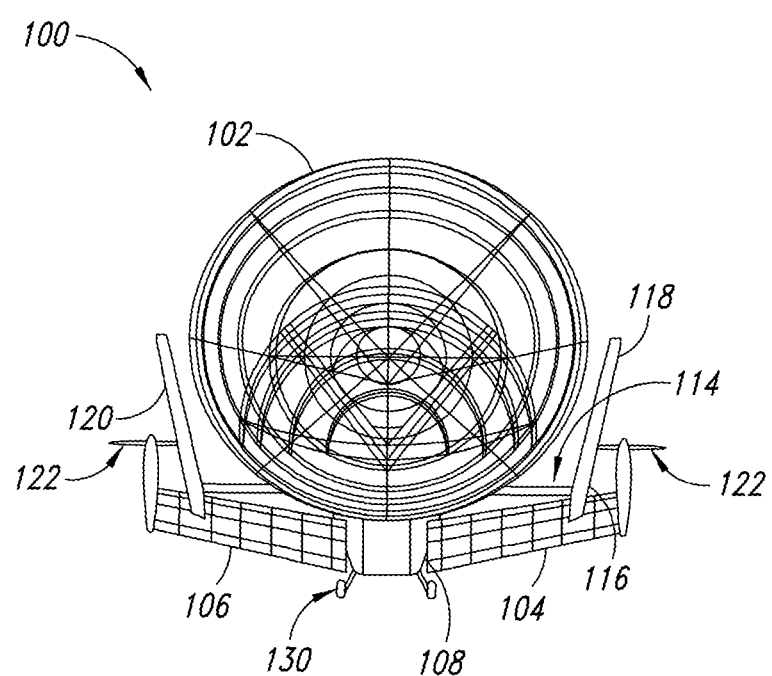

With respect to the design of the envelope, FIGS. 2-4 show a see-through view of the Plimp 100 from a side, top, and front view in which the motor nacelles 126 are in a horizontal forward-facing orientation. As can be seen in FIGS. 2 and 3, the tail boom 110 is supported with support struts 132 attached to the structural support 134 of the envelope 102. Formed within the envelope 102 are fore and aft ballonets 136, 138, respectively. These ballonets 136, 138 are well-known structures used in airship design to provide ballast. Ideally, these are air-filled envelopes or bags located inside the main hull of the envelope 102. Inasmuch as air has a higher specific gravity or weight than helium, the ballonets are inflated with air to make the Plimp descent and are deflated with air to make the Plimp ascend, or to assist in ascent in combination with forward movement of the wings 104, 106 and any upward vector of thrust provided by the propulsion system, in this case the propellered motors in the nacelles 126. It will also be appreciated that the ballonets 136, 138 are used to control the trim (horizontal leveling) of the Plimp 100.

As seen more clearly in the top view of FIG. 3, the wings 104, 106 have a forward sweep. The use of forward swept wings 104, 106 causes the propellers 122 to be high above the ground when in vertical flight position. This is done for safety and also to position the propellers nearer to the vertical centerline of the hull or envelope 102 to reduce the aerodynamic interference as the air is pulled around the hull and into the propellers. Also, differential rotation of the wings 104, 106 enables the pilot to easily turn the vehicle by angling one wing down-forward and the other down-backward, which will make the vehicle spin about a vertical axis.

In considering the operational environment of the Plimp, it is assumed that helium will have a purity of 97.5% with a density of 0.01304 pounds per ft$^3$. On an average summer day with ambient air temperature at 77 degrees Fahrenheit and 70.2% humidity, the resulting lift will be approximately 57 pounds per ft$^3$ of helium. If the design goal is 74% fullness for 10,000 feet of operation, there would be 49.6 pounds per 1,000 ft$^3$ of lift. The ballonets 136, 138 must be 26% of the internal volume. Using classic airship tail sizing of 13% of main hull volume (V), the tail sizing would be 13% V$^{0.666}$. A 15% hull drag reduction would be applied for scale effects.

The motors used for propulsion could be adapted from existing electric motors having an 8-inch diameter, 12-inch length, 25-kilogram (55 pounds) plus controller for 30 pounds, and a 140 kilowatt (187 BHP) for five minutes yields 3.4 horsepower per pound where the controller adds 55% of the weight.

For the larger Plimp 300, there would need to be two 600 horsepower motors weighing about 180 pounds each (with 100 pounds for the controller). It is assumed that for the larger model the batteries would be 3.2 times as heavy as the batteries in the Plimp 100 and have 1.5 times the size. For low-speed efficiency in the Plimp 300 version, studies indicate a prop sizing of 9.1 feet would be preferred.

Battery power provided for the motors would ideally come from lithium ion batteries having an energy density of 0.2 kw-h/kg. The forecast for battery development within the next five years indicates a potential of 1 kw-h/kg as possible energy source. The battery volume is approximately 0.5 kw-h/liter, which amounts to 500 kw-h/m$^3$. For the Plimp 100, this would result in a propeller sizing of approximately 5.9 feet diameter.

Although ducted fans could be used, as they are on blimps and radio-controlled models, they are rarely used on real aircraft because they are less efficient during cruise due to drag of the duct, reduction of flow constraint benefit, and lower desired thrust level. In addition, height clearances must be maintained between blade tips and the duct. There are also weight, drag, and maintenance issues of the duct itself plus attachments, as well as requirements for additional design, analysis and testing in order to use such ducted fans. When drag and weight considerations are factored in, the advantage of a ducted fan dissipates or disappears around 50 knots when drag and weight are considered up to 100 knots of airspeed.

The actual size of the battery for the Plimps 100, 300 will depend upon mission assumptions and drag calculations. Ideally the hull and ballonet material are assumed to be CT35HB Aramid composite material that has low gas permeability, excellent low temperature performance, and excellent pressure retention. Using this material, the hull envelope weight would be approximately 0.0326 pounds per ft$^2$. Factoring in catenary and miscellaneous weights would add about 10% to the envelope weight. Table A below provides specifications for lift and weight.

TABLE A

| | |
|---|---|
| Lift/cuft | 0.0496 |
| Volume | 33279.33 |
| Hull Lift | 1650.655 |
| Req. Tail Area | 133.5708 |
| Skin wt/sqft | 0.0326 |
| Surface area | 5814.738 |
| Skin weight | 189.5605 |
| Catenary Wt | 18.95605 |
| suspension wt/cuft | 0.000812 |
| Suspension weight | 27.009 |
| Nose reinfrc. wt/cuft | 0.001249 |
| Nose reinforcement wt | 41.5523 |
| Req Ballonet Vol (ea) | 4326.313 |
| Ballonet Vol (ea) | 4331.922 |
| Ballonet wt/sqft | 0.0326 |
| Ballonet surface area | 1249.441 |
| ballonet weight (each) | 28.51224 |
| Total Hull Weight | 334.1023 |
| Lift Net of Hull Weight | 1316.552 |

Avionics and flight control will meet all FAA requirements for communication and navigation equipment. Ideally, autonomous flight and navigation capabilities will be provided. The weight of the required hardware for the avionics is in the range of 40-66 pounds, which is roughly three times that of a typical two-seat general aviation aircraft. Flight control must be fully actuated to enable unmanned flight, and there will be approximately 135 pounds of electrical servo system using its own battery power for unmanned flight.

Range calculations assume that maximum thrust for takeoff will be used for about two minutes and landing for approximately ½ minute. Thirty-three percent of thrust is assumed for loiter. While aircraft require a 20-minute loiter, the Plimp 100 will have about 5 minutes loiter since landing is done vertically. At 85-knot cruise at 5,000 feet, 75% thrust would be needed. Four hundred pounds of batteries will provide approximately 13 minutes of cruise time, which equals a range of about 25 nautical miles. If the gross weight of the Plimp is 3,050 pounds, this allows adding additional 600 pounds of batteries, giving about 23 minutes of cruise at 45 nautical miles per hour.

With additional battery energy density improving in the coming years, it is possible that the range could increase to 200 nautical miles with 780 pounds of batteries if the battery energy density improves four times that over current technology. The 200 nautical mile range is possible with additional weight savings or by increasing prop size to allow for 3,230 pounds total overall gross weight. Table B below shows the energy density, battery volume, power, and efficiency data for two battery weights and volumes.

TABLE B

| STRUCTURES GROUP | 1169.9 | EQUIPMENT GROUP | 305.1 |
|---|---|---|---|
| Wing | 232.3 | Flight Controls | 135.7 |
| Horiz. Tail | 89.8 | | |
| Vert. Tail | 109.5 | Electrical | 53.3 |
| Hull | 334.1 | Avionics, sensors, & computers | 66.1 |
| Nacelles | 20 | Furnishings | 50 |
| Cabin-Fuselage | 247.8 | | |
| Tail Boom & Struts | 44.2 | We-misc | 0 |
| Main Lndg Gear | 50.7 | 5% We-Allowance | 108.435 |
| Nose Lndg Gear | 41.5 | TOTAL WEIGHT EMPTY | 2277.135 |
| PROPULSION GROUP | 693.7 | USEFUL LOAD GROUP | 522.865 |
| Engines & Motor Controllers | 170 | Crew | 440 |
| Props & Eng Installation | 83.7 | UL margin | 22.865 |
| Batteries | 400 | | |
| Tail Rotor, Motor, & Actuation | 40 | Payload | 60 |
| | | TAKEOFF GROSS WEIGHT | 2800 |

FIGS. 5-8 illustrate the Plimp 100 in the VTOL configuration in which both the wings 104, 106 and attached nacelles 126 with motors 124 and propellers 128 have been rotated upward 90 degrees so that the thrust from the propellers 122 is vertical. This is the ideal configuration for takeoff and landing in the VTOL mode. However, the wings 104, 106 can be rotated to various orientations, either together or independently to vector the thrust in desired directions for both horizontal and vertical movement as well as yaw, i.e., movement around a vertical axis. Ideally the wings rotate in a range of at least 90 degrees to and including 180 degrees about a longitudinal axis of the wing, which is lateral to a longitudinal axis of the envelope. In some configurations the wing can rotate beyond 180 degrees, to and including 270 degrees, and beyond 270 degrees.

Figure 9:
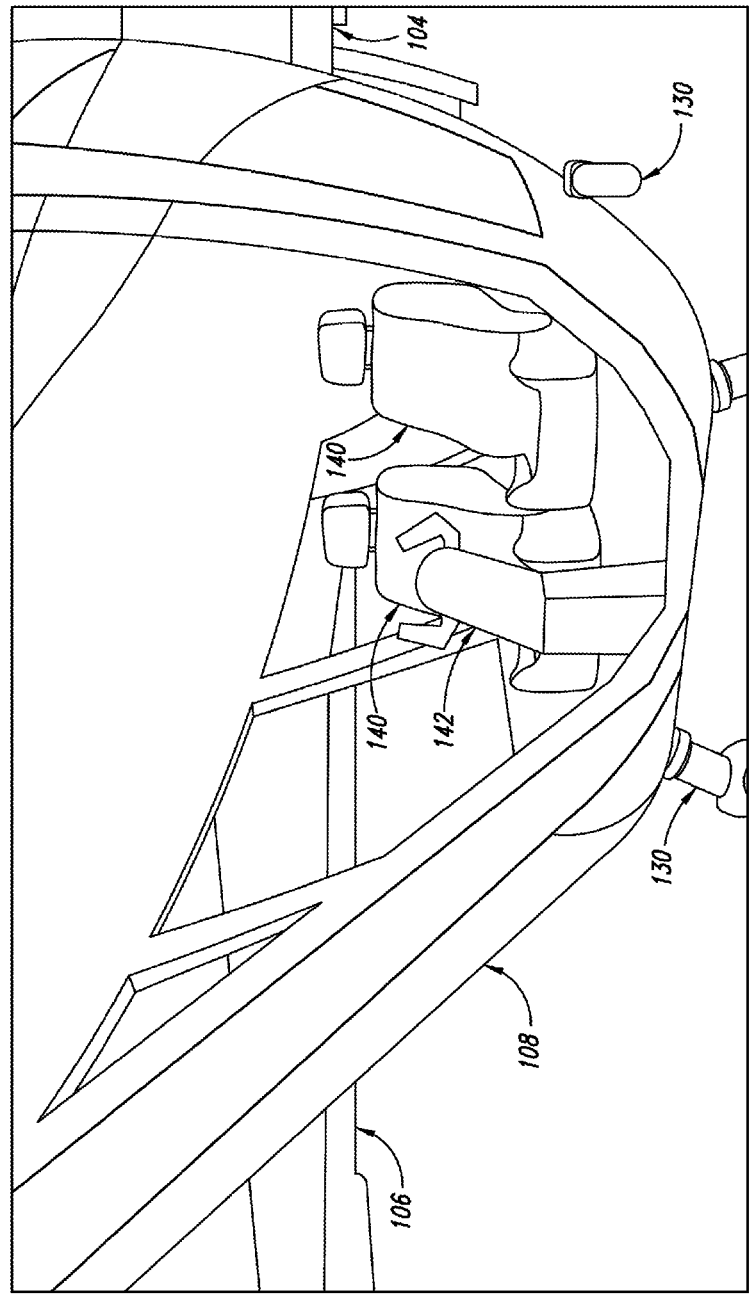
FIG. 9 is an enlarged isometric view of the vehicle cabin of the first embodiment.

FIG. 9 illustrates the fuselage 108 in a tandem two-seat passenger configuration, similar to a gondola used on existing blimps. In this design, the wings 104, 106 are attached to the fuselage instead of to the envelope. Thus, stresses are borne by the fuselage instead of the envelope. As seen in FIG. 9, a control column 142 is positioned forward of the pair of seats 140, and can be configured to be slid to the left or right to provide for pilot seating on either side of the Plimp 100.

Figure 10:
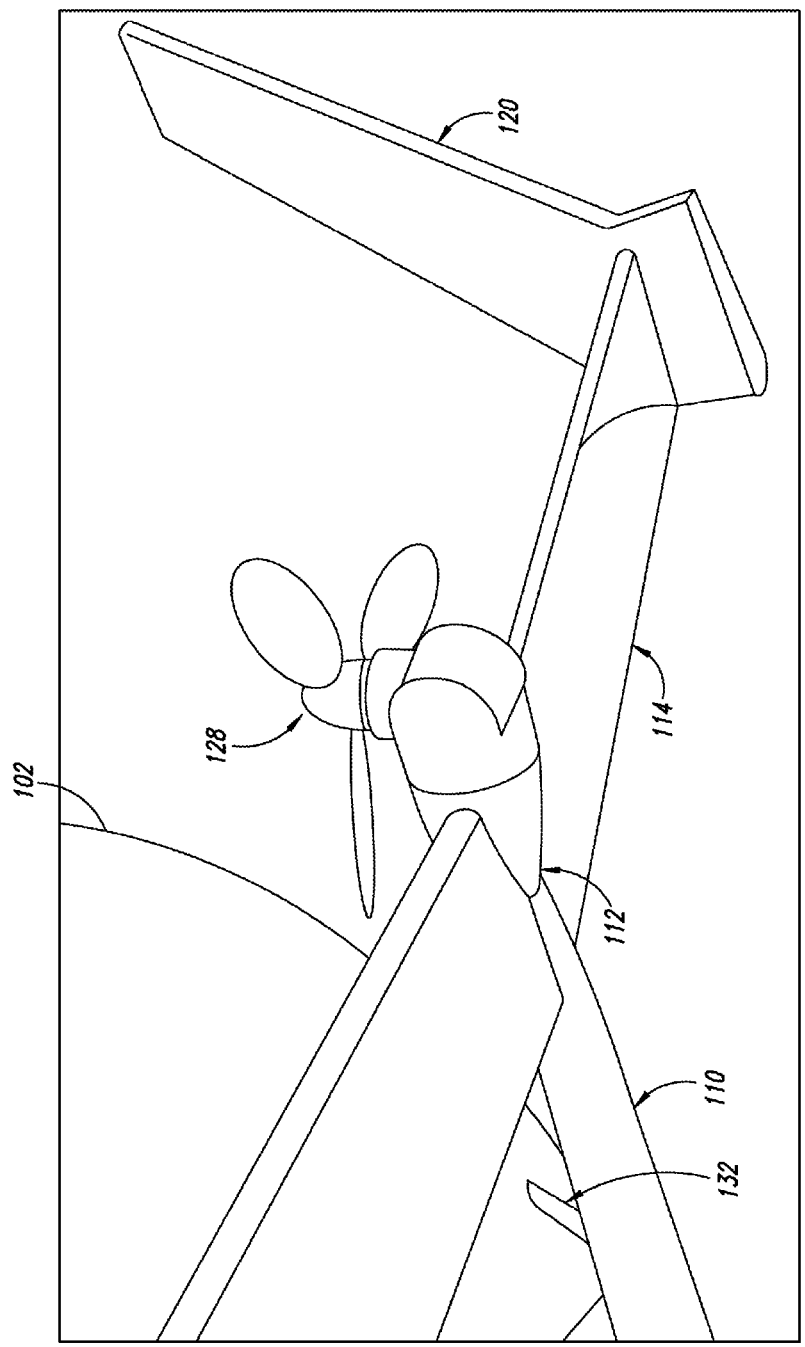
FIG. 10 is an enlarged isometric view of a rear propeller mounted for orbital movement on the tail structure of the first embodiment.

Shown in FIG. 10 is a close-up view of the orbital tail rotor 128 that is mounted to rotate about a horizontal axis as well as pivot about a transverse axis to aid in controlling directional movement of the Plimp 100. While conventional airplane control surfaces such as ailerons, rudders, and elevators can be used during flight in which the wings 104, 106 are generating lift, in slow or stationary flight, the tail rotor 128 provides the ability to maneuver the Plimp 100 about all three axes of control (pitch, roll, and yaw). It is to be understood that a ducted-fan design for the tail rotor may also be used in certain designs.

Figure 11:
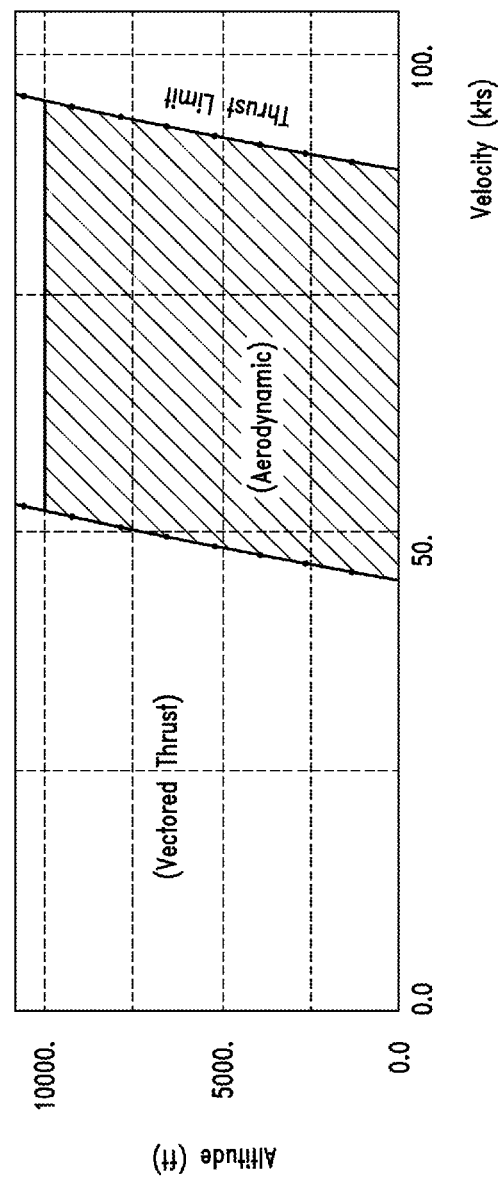
FIGS. 11-13 are a Flight Envelope, Rate of Climb, and Rate of Climb—Engine out charts for the first embodiment.
Figure 12:
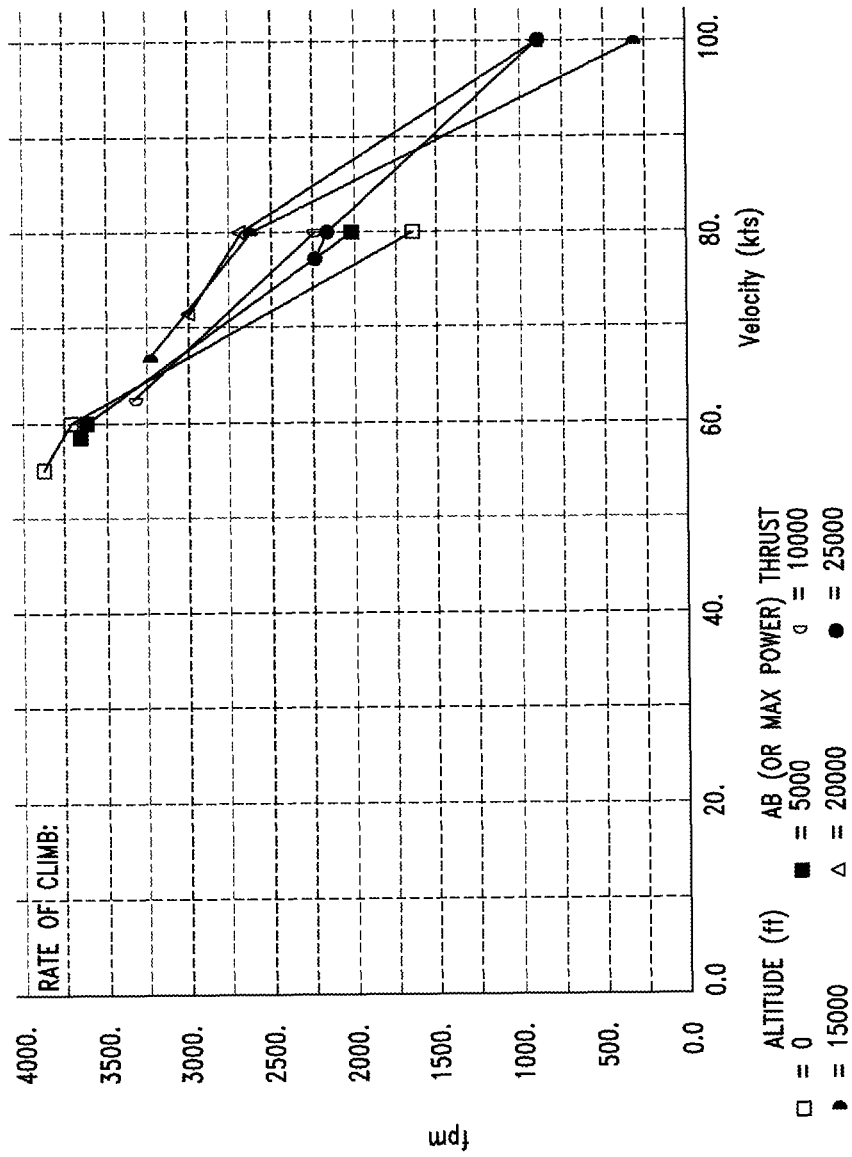
Figure 13:
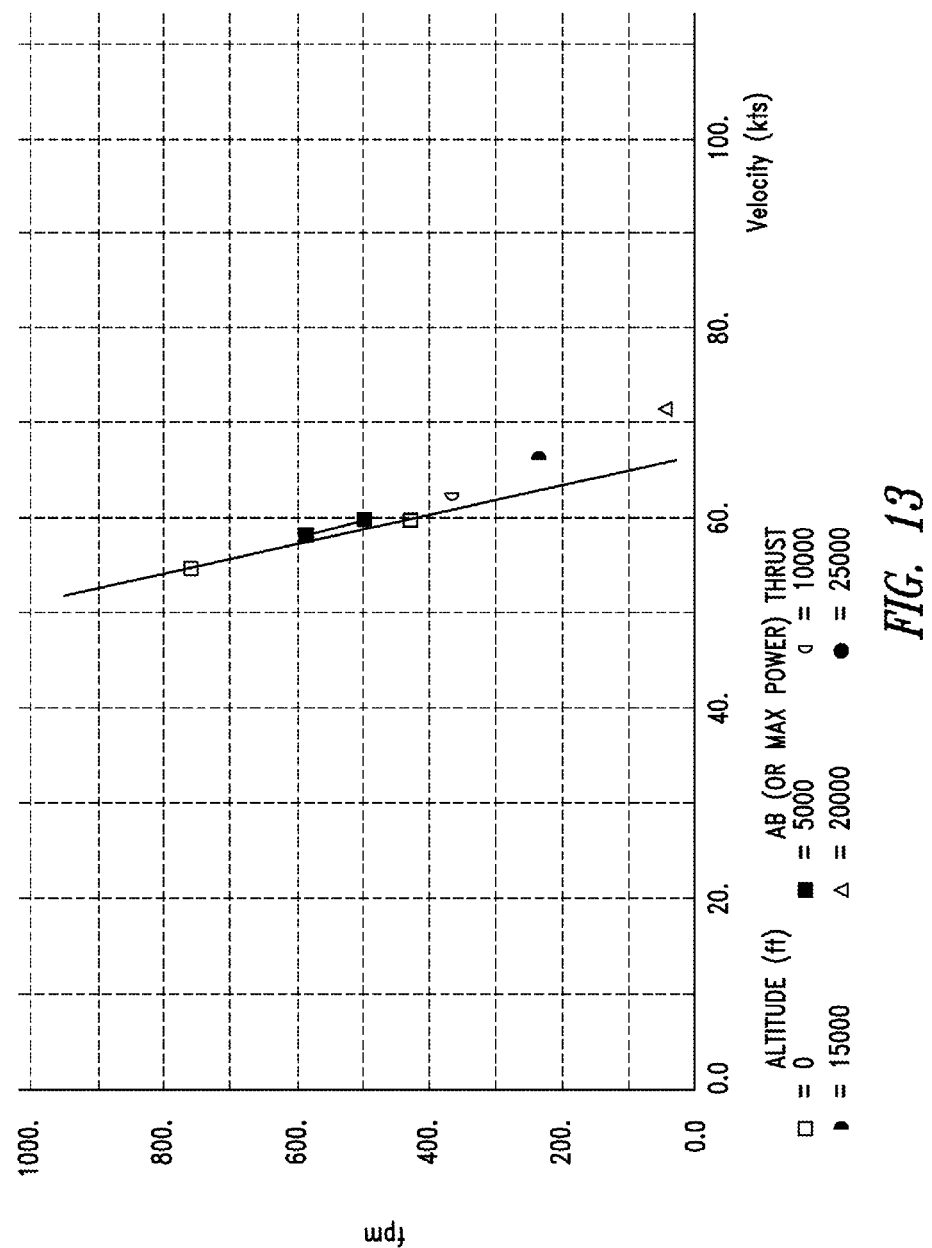

FIGS. 11-13 are graphs of the flight envelope, rate of climb, and rate of climb-engine out performance for the Plimp 100 using the designed specifications discussed herein. If both engines are out at any altitude, the size and drag of the vehicle means it will drop at a maximum 26 feet per second. Comparatively, this is not very fast because military planes suffer zero damage at a drop rate of 24 feet per second. Passengers and cargo would be safe at this level of engine-out performance. Regardless of the altitude. Passengers and cargo would be safe because the vehicle will not descend faster than 26 fps, which is relatively slow (=19 mph).

Figure 14:
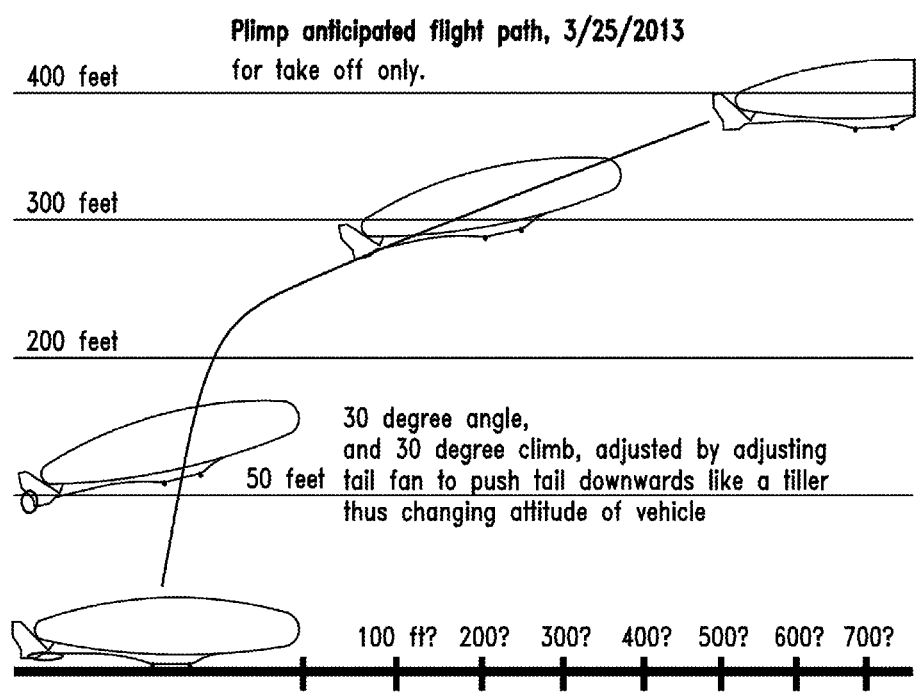
FIG. 14 is a side view illustrating stages of vehicle operation of the first embodiment.
Figure 15:
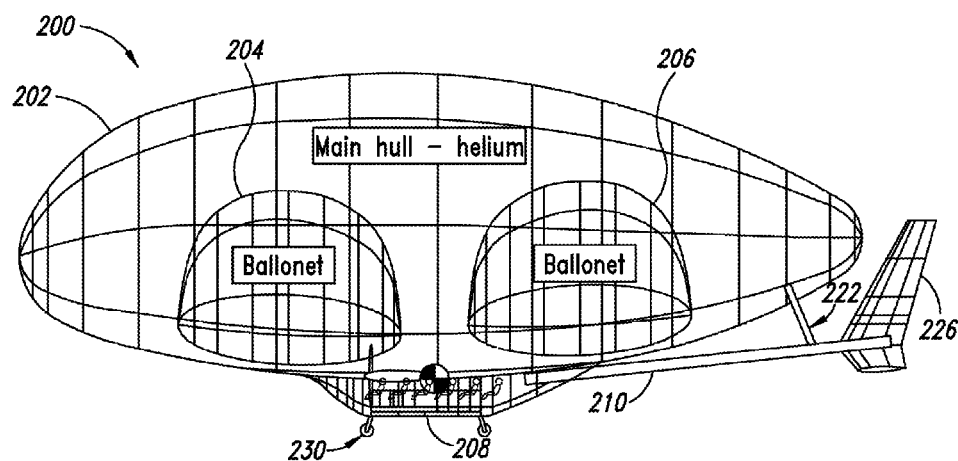
FIGS. 15-17 are side, top, and front plan views respectively of the second embodiment the vehicle.
Figure 16:
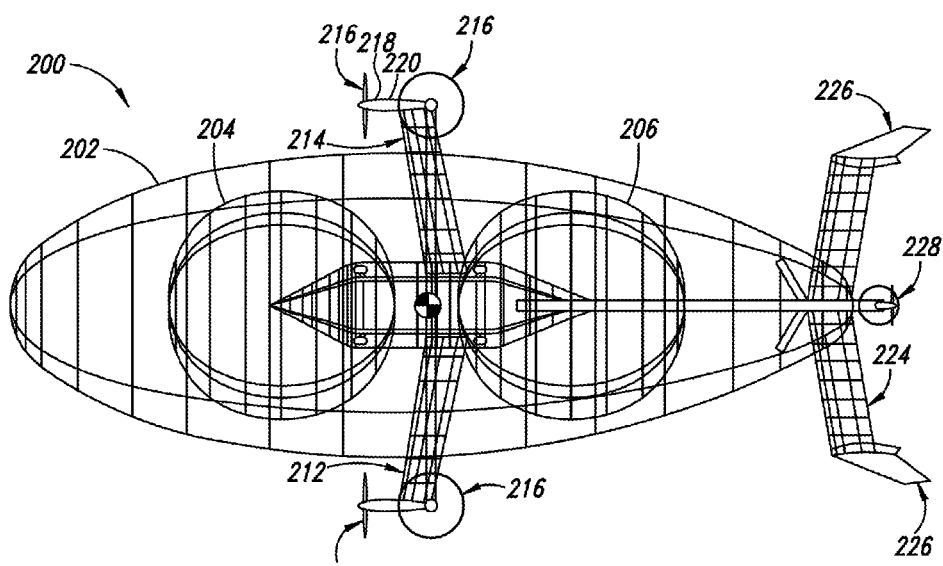
Figure 17:
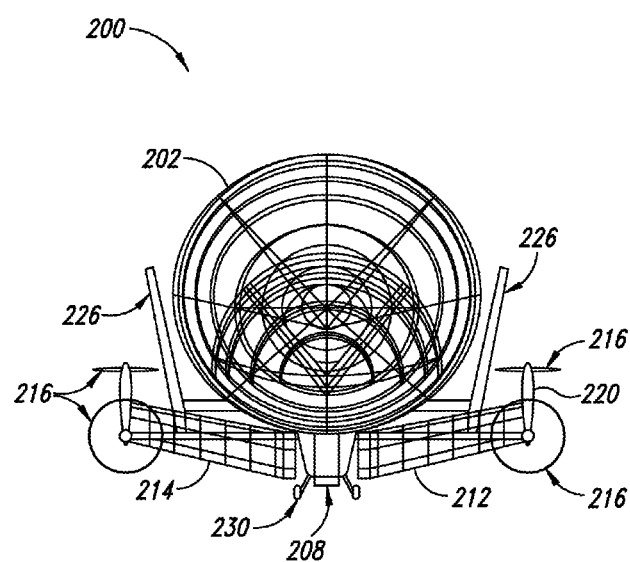

Referring next to FIG. 14, represented therein is an anticipated flight path for takeoff only for the Plimp 100. With the propellers rotated upward 90 degrees for vertical takeoff, the Plimp 100 rises to approximately 50 feet, at which point or during the ascent, the angle of pitch would increase to 30 degrees using the tail rotor 128 to provide an approximate 30-degree climb angle. Forward movement is then commenced by rotating the propellers forward as the Plimp 100 continues to climb from 50 feet through 400 feet and moving forward from the takeoff point to 700 feet and farther. It is to be understood that the vehicle can achieve a climb angle of up to 45 degrees or greater, depending upon the configuration.

FIGS. 15-18 illustrate the second embodiment of the present disclosure in which the Plimp 200 is designed to carry up to 12 passengers or 10-12 cargo boxes (3.3-foot sq.) for a total payload of 2,400 pounds. As can be seen in FIGS. 15-18, the Plimp 200 has a larger envelope 202, which includes the fore ballonet 204 and the aft ballonet 206. The plimp 200 will have a length in the range of 100 feet to 200 feet, and more preferably about 150 feet long. An enlarged fuselage 208 is attached to the envelope 202 and has the tail boom 210 extending therefrom as well as left and right wings 212, 214, respectively. At the end of each wing is a propeller 216 driven by an electric motor 218 housed in a nacelle 220. Struts 222 support the tail boom 210 on the envelope 202 and provide support for the horizontal stabilizer 224, the vertical stabilizers 226, and the tail rotor 228. Larger wheels 230 extend from the enlarged fuselage 208, as shown more clearly in FIG. 18. The fuselage 208 is enlarged to carry up to 12 people in side-by-side arrangement, i.e., in six rows of two seats each. A removable battery pack can be stored under the fuselage 208 to provide power for the control, navigation, and propulsion systems.

Figure 18:
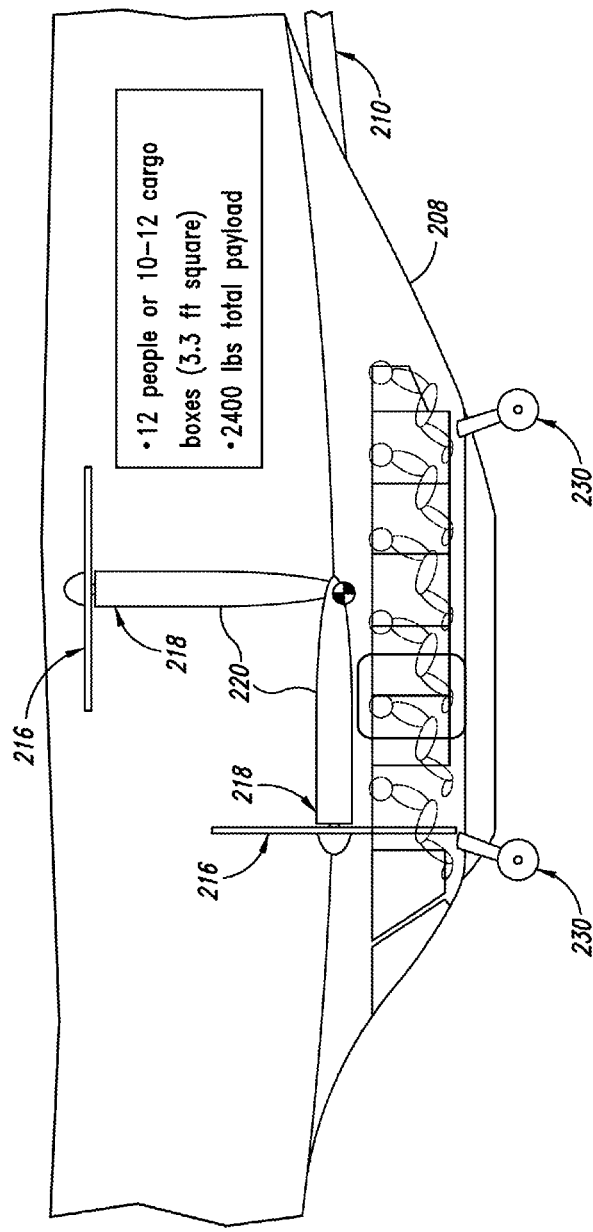
FIG. 18 is an enlarged side view of the vehicle cabin and nacelles of the second embodiment.

FIG. 18 also shows in greater detail the orientation of the nacelles 220 from a forward horizontal position rotated upward 90 degrees to a vertical orientation. Ideally, the nacelles 220 with motors 218 and propellers 216 rotate in combination with the wings 212, 214 to which they are attached. The wings can be rotated together or independently to enable a variety of control configurations for the Plimp 200.

Figure 19:
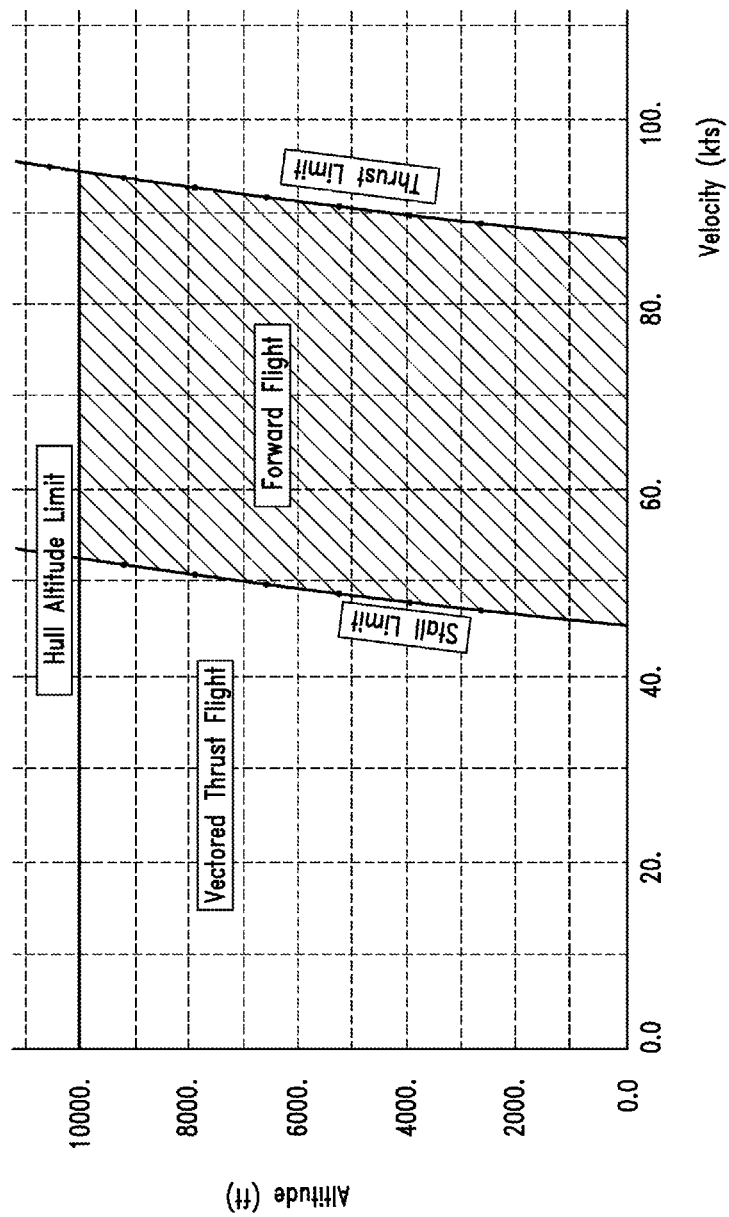
FIGS. 19 and 20 are Flight Envelope and Rate of Climb charts for the second embodiment of the vehicle.
Figure 20:
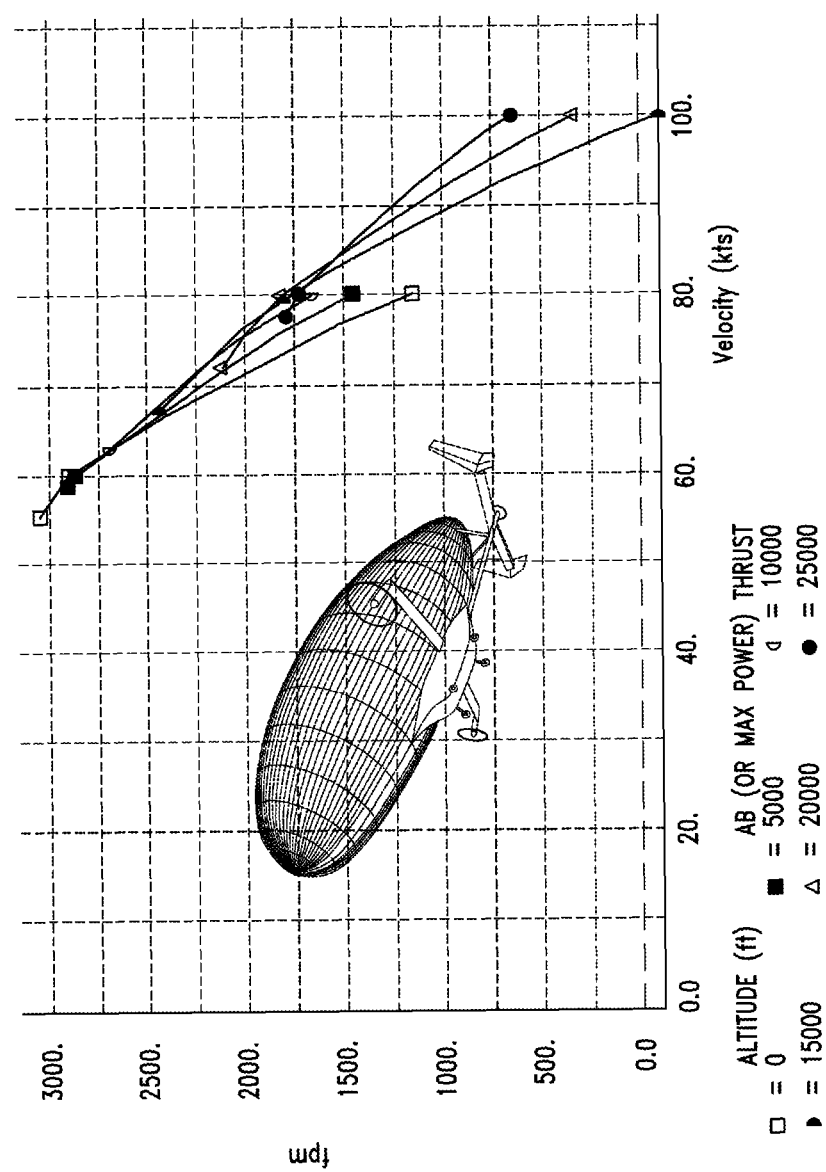

FIGS. 19 and 20 show the flight envelope and rate of climb, respectively, for the Plimp 200.

As will be readily appreciated from the foregoing, the Plimps 100, 200 are plane-blimp hybrids designed for small cargo delivery and local passenger transportation. Electric-powered dynamic lift non-rigid air shift is provided that obtains a non-trivial portion of its lift from aerodynamics as well as from aerostatic lift from the envelope. Inasmuch as the vehicle is intended to operate from small sites, VTOL capability at the maximum weight must be provided.

Computerized, automated flight control systems can be provided to include landing terminal guidance, especially in windy conditions. However, it is expected that unmanned flights, especially for cargo applications, can be utilized with control being provided by radio communications from ground locations, either directly or through satellite relays. Onboard control systems utilizing preprogrammed flight paths can also be incorporated into the control system.

Ideally, the Plimp 100 will have vertical takeoff or landing capability, with zero airspeed controllability as well as rolling STOL (short takeoff or landing) capability using the wheels. The preferred length of the Plimp 100 is 50 feet, although design constraints and functional considerations may require it to be in the range of 50 feet to 90 feet. Ideally Plimp 100 will have an unmanned payload of approximately 500 pounds or an alternate payload of two people plus baggage. Electric power is provided for the propulsion motors either via a battery or fuel cell, or other means known to those skilled in the art. With a projected top speed of 90 miles per hour and a range of 200 miles, the vehicle can provide both cargo and passenger delivery as well as sight-seeing and other commercial activities.

When on the ground, the Plimps 100, 200 are designed to be tethered to a mooring station, tied down using conventional tie-down apparatus, or parked in a hanger. Ideally mooring would be accomplished via an electromagnetic anchoring system, which enables the plimp to be disengaged with minimal, if any, ground crew assistance. For example, the pilot or ground controller would be able to remotely disengage the plimp via an RF or hard wired connection to the electromagnetic anchoring system. Powered electromagnets would be located in the fuselage or the wings or both and configured to interact with the mooring station, either at a single location or multiple locations on the ground about the plimp.

As will be readily appreciated from the foregoing, the present disclosure provides a hybrid aircraft that utilizes both aerostatic buoyancy generated by a gas in combination with lift generated by an airfoil (e.g., one or more fixed wings or rotary wings) moving through the air along with thrust generation devices on each wing, for example, propellers, fans, jets, and the like.

Ideally the vehicle is provided that includes a first lift device capable of providing aerostatic buoyancy; a second lift device capable of providing dynamic lift through movement in the air; and a system structured to generate thrust coupled to the second lift device, the second lift device and the thrust generation system is capable of rotating together about an axis that is lateral to a longitudinal axis of the vehicle at angles at least in the range of 90 degrees to and including 180 degrees. An orbital tail rotor provides for directional control and stability.

The various embodiments described above can be combined to provide further embodiments. For example, the size of the vehicle can be enlarged or reduced to meet operational specifications of particular applications of the technology disclosed herein. In addition, the vehicle can be adapted for use on water, snow and ice, and on vehicles, such as a flat-bed trailer, a ship, and the like. These and other changes can be made to the embodiments in light of the above-detailed description.

The invention claimed is:

1. A hybrid VTOL vehicle for air travel, comprising:
   a fuselage configured to hold passengers and cargo;
   a first lift device coupled to the fuselage and configured to provide hydrostatic buoyancy;
   a second lift device coupled to the fuselage and configured to provide dynamic lift through movement of the second lift device through the air;
   a tail boom extending aft from the fuselage;
   a horizontal stabilizer and a vertical stabilizer extending from the tail boom; and
   a thrust generation device structured to generate thrust, the trust generation device coupled to the second lift device, the second lift device and the thrust generation device configured to be capable of rotating together about an axis that is lateral to a longitudinal axis of the fuselage up to a maximum of 180 degrees.

2. The vehicle of claim 1, wherein the second lift device comprises first and second lift generating wings on opposing first and second sides of the fuselage, the first and second wings each having a respective thrust generation device mounted thereon, and each of the first and second wings configured to individually rotate about the lateral axis independently of the other of the first and second wings.

3. The vehicle of claim 2, wherein each thrust generation device comprises a propeller driven by an engine, the engine mounted to a respective wing and configured to move jointly with the wing when the wing rotates about the lateral axis.

4. The vehicle of claim 1, wherein the first lift device comprises an envelope configured to hold a gas that is configured to provide displacement buoyancy to the vehicle.

5. The vehicle of claim 1, wherein the second lift device comprises first and second wings extending from the fuselage in a direction that is lateral to a longitudinal axis of the fuselage.

6. The vehicle of claim 5, wherein the first and second wings are each configured to rotate about an axis that is lateral to the longitudinal axis of the fuselage.

7. The vehicle of claim 5 wherein the first and second wings have a forward sweep.

8. The vehicle of claim 1, further comprising a tail rotor attached to the tail boom.

9. A vehicle, comprising:
   an envelope configured to hold a gas that is capable of providing hydrostatic displacement buoyancy to the vehicle, the envelope having a longitudinal axis between fore and aft of the envelope;
   a compartment attached to the envelope;
   a tail boom extending aft from the compartment;
   a horizontal stabilizer and a vertical stabilizer attached to the tail boom aft of the compartment;
   first and second wings attached to opposing first and second sides of the compartment, the first and second wings capable of providing dynamic lift through movement of the vehicle through the air and capable of rotating about an axis that is lateral to the longitudinal axis of the envelope through angles at least in the range of 90 degrees to and including 180 degrees; and
   a first and second thrust generation device coupled to the respective first and second wings and capable of generating thrust, the first and second thrust generation devices capable of rotating together with the first and second wings.

10. The vehicle of claim 9, further comprising a tail rotor attached to the tail boom.

11. The vehicle of claim 9, further comprising an orbital tail rotor attached to the tail boom.

12. The vehicle of claim 9, wherein the first and second wings have a forward sweep.

13. The vehicle of claim 9, wherein the compartment comprises a fuselage capable of holding passengers.

\* \* \* \* \*

UNITED STATES PATENT AND TRADEMARK OFFICE
CERTIFICATE OF CORRECTION

PATENT NO. : 9,856,007 B2  
APPLICATION NO. : 14/898708  
DATED : January 2, 2018  
INVENTOR(S) : James C. Egan et al.

Page 1 of 1

It is certified that error appears in the above-identified patent and that said Letters Patent is hereby corrected as shown below:

In the Claims

Column 10, Claim 9, Line 47, "between fore and aft of the envelope" should read --between a fore and aft of the envelope;--

Signed and Sealed this  
Twenty-fifth Day of June, 2019

Andrei Iancu  
*Director of the United States Patent and Trademark Office*